(12) United States Patent
Pratley

(10) Patent No.: US 9,461,450 B2
(45) Date of Patent: Oct. 4, 2016

(54) METHOD OF FORMING AN ANCHOR ON AN INSULATED CABLE

(75) Inventor: Kimleigh George Montague Pratley, Krugersdorp (ZA)

(73) Assignee: Pratley Investments (Proprietary) Limited, Krugersdorp (ZA)

( * ) Notice: Subject to any disclaimer, the term of this patent is extended or adjusted under 35 U.S.C. 154(b) by 0 days.

(21) Appl. No.: 13/034,365

(22) Filed: Feb. 24, 2011

(65) Prior Publication Data
US 2011/0211906 A1 Sep. 1, 2011

(30) Foreign Application Priority Data
Feb. 25, 2010 (ZA) .................................. 2010/01372

(51) Int. Cl.
| | | |
|---|---|---|
| *H01B 13/00* | (2006.01) | |
| *H01B 17/34* | (2006.01) | |
| *H01B 7/02* | (2006.01) | |
| *H01B 13/06* | (2006.01) | |
| *H01B 13/22* | (2006.01) | |
| *B29C 65/00* | (2006.01) | |
| *B32B 37/00* | (2006.01) | |
| *C09J 4/00* | (2006.01) | |
| *C09J 101/00* | (2006.01) | |
| *C09J 201/00* | (2006.01) | |
| *H02G 3/22* | (2006.01) | |
| *B29C 65/48* | (2006.01) | |

(52) U.S. Cl.
CPC ............... *H02G 3/22* (2013.01); *B29C 65/484* (2013.01); *B29C 66/5221* (2013.01); *Y10T 403/477* (2015.01)

(58) Field of Classification Search
CPC .. H02G 15/00; H02G 15/003; H02G 15/013; H02G 15/02; H02G 15/04; H02G 15/043; H02G 15/046; H02G 15/06; H02G 15/076; H02G 15/20; H02G 15/22; H02G 15/23; H02G 1/14; H02G 1/145; H02B 7/17; H02B 7/28; H02B 7/282; H02B 7/285; H02B 7/288; B29K 2105/16; B29C 66/1122; B29C 66/5221; F16L 5/02
USPC ........ 156/47, 48, 51, 52, 60, 62.2, 276, 293, 156/294, 296, 303.1, 305, 307.1, 307.3, 156/307.7, 331.2; 277/312, 314, 316, 590, 277/602, 608, 609, 627
See application file for complete search history.

(56) References Cited

U.S. PATENT DOCUMENTS

| | | | | |
|---|---|---|---|---|
| 3,523,607 A | * | 8/1970 | Thompson | ......... B65D 81/3266 174/76 |
| 4,092,296 A | * | 5/1978 | Skiff | ...................... C08G 59/68 521/103 |

(Continued)

FOREIGN PATENT DOCUMENTS

EP 1170846 A1 * 1/2002 ........... H02G 15/068

*Primary Examiner* — Philip Tucker
*Assistant Examiner* — Brian R Slawski
(74) *Attorney, Agent, or Firm* — Nelson Mullins Riley & Scarborough LLP; Anthony A. Laurentano

(57) ABSTRACT

The invention relates to a method of forming an anchor on an insulated cable so as, for example, to attach an electrical power cable to an electrical apparatus. The method includes the steps of providing a wicking material in contact with the insulation of the cable; introducing a liquid, settable adhesive into the wicking material on the insulated cable; and allowing the liquid, settable adhesive to be wicked into the wicking material and to set so as to bond the wicking material to the insulation of the cable and form a projecting anchor on the insulated cable.

9 Claims, 2 Drawing Sheets

(56) References Cited

U.S. PATENT DOCUMENTS

| | | | |
|---|---|---|---|
| 4,751,947 A * | 6/1988 | Landers | B29C 44/185 138/89 |
| 6,459,074 B1 * | 10/2002 | Michelbach et al. | 219/541 |
| 2006/0124339 A1 * | 6/2006 | Goehlich | 174/74 R |
| 2006/0196957 A1 * | 9/2006 | Johnson | 237/56 |
| 2007/0137784 A1 * | 6/2007 | McDonnell et al. | 156/293 |

* cited by examiner

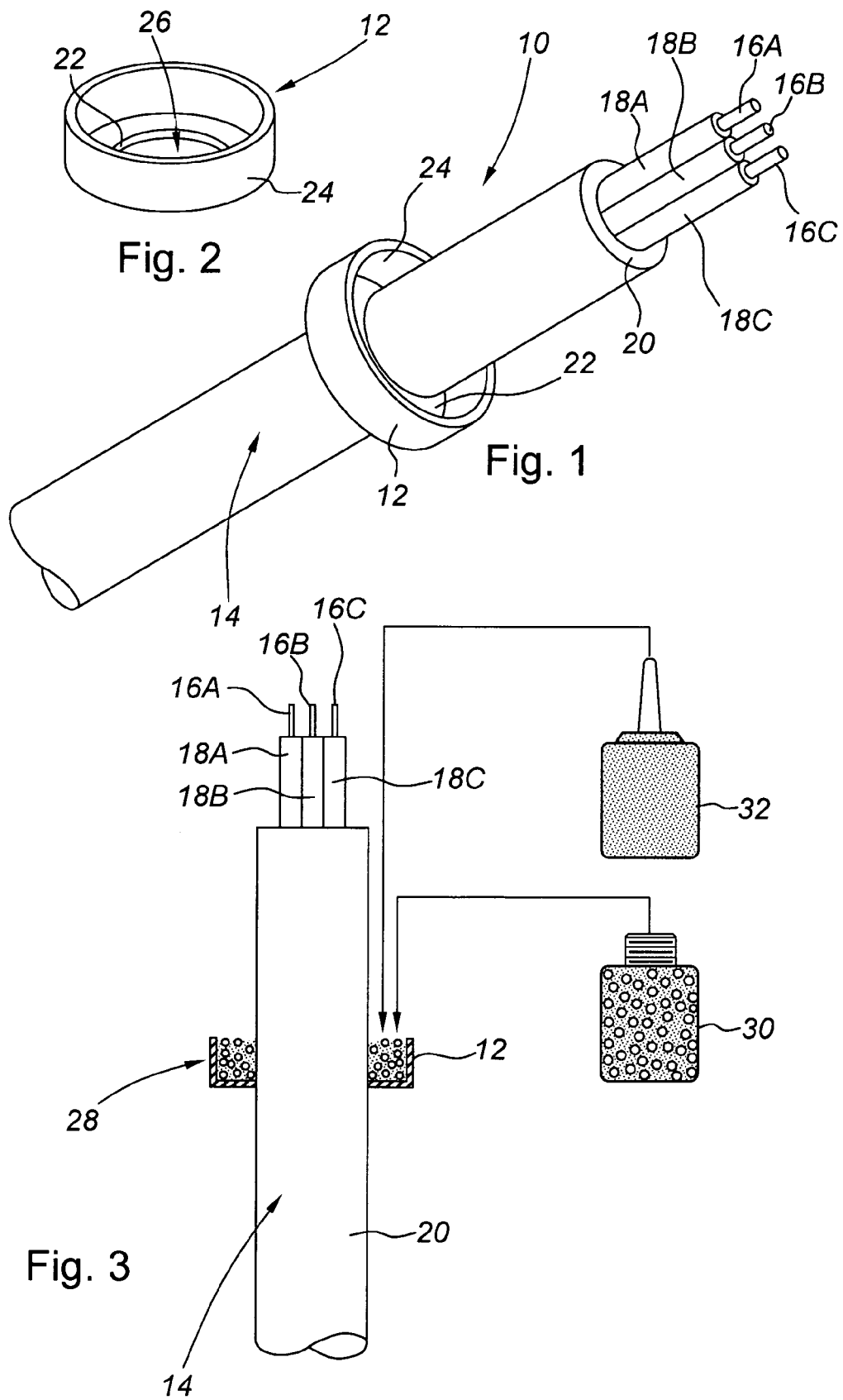

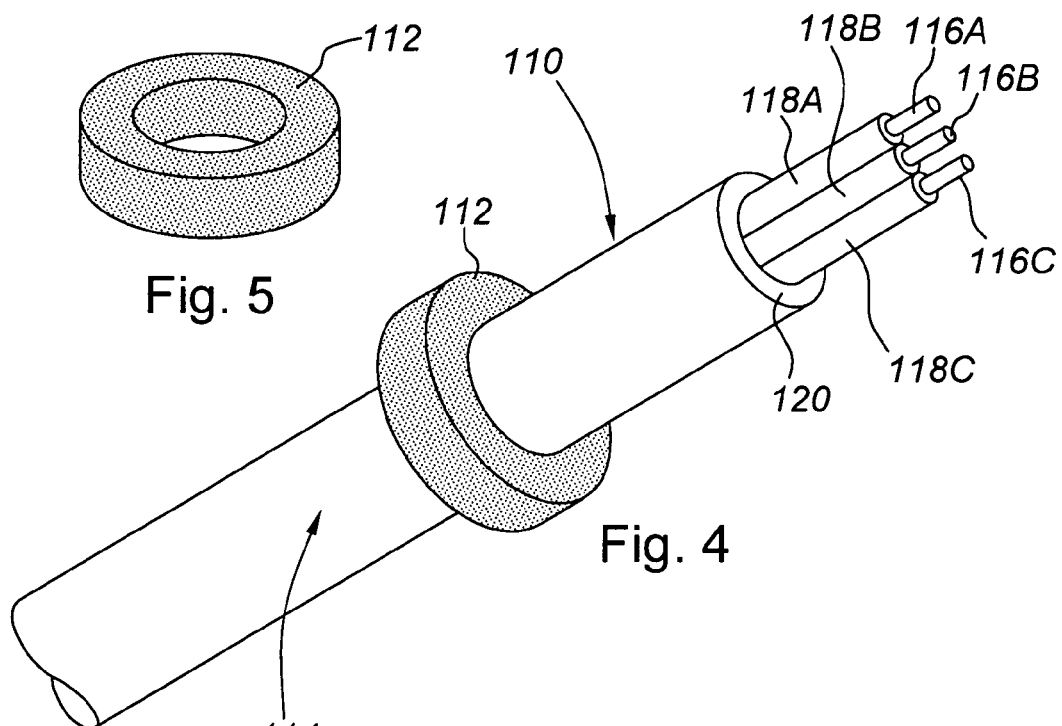
Fig. 5
Fig. 4
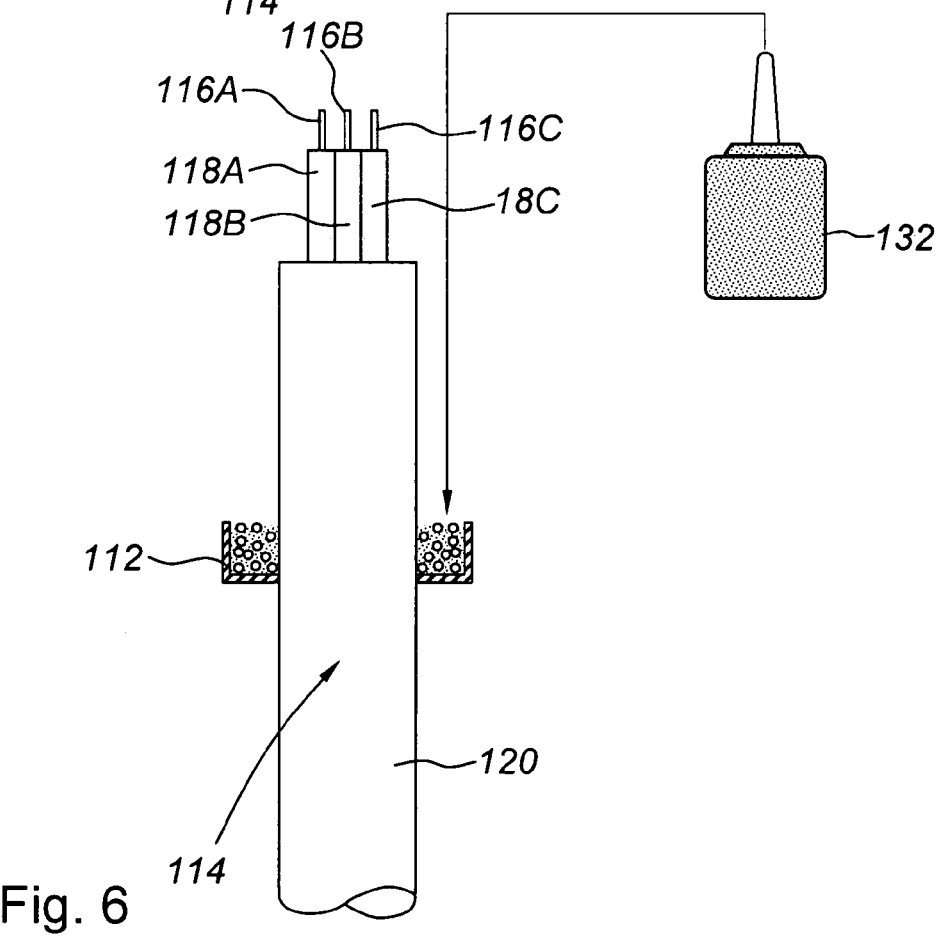
Fig. 6

METHOD OF FORMING AN ANCHOR ON AN INSULATED CABLE

RELATED APPLICATION

This application claims priority to South Africa Patent Application No. 2010/01372 filed on Feb. 25, 2010 in South Africa. The contents of the aforementioned application are hereby incorporated by reference.

BACKGROUND OF THE INVENTION

THIS invention relates to insulated cables such as electrical power cables, and more specifically to a method of forming an anchor on such a cable. The invention also relates to an anchor on an insulated cable, and to a kit for forming such an anchor.

When a cable enters an apparatus, it often does so via a cable entry device which grips the cable and anchors it to the apparatus. For example, electrical power cables generally are anchored to electrical apparatus with cable glands which prevent loads applied to the cable from being transferred to conductors inside the electrical apparatus.

In the case of unarmoured cables, the device gripping the cable typically relies on the friction force between an elastomeric element on the device and the outer sheath of the cable. To achieve the required friction, it is usually necessary for the elastomeric element on the device to press relatively hard onto the cable sheath with continuous force.

Since polymeric materials are subject to creep, the materials of both the elastomeric element on the cable entry device and the cable sheath will creep with time under continuous force, and this has the undesirable effect of reducing the friction force and hence the anchoring efficacy.

It is an object of the present invention to provide a method of forming an anchor on an insulated cable, particularly an unarmoured electrical power cable, which is effective in anchoring the insulated cable without the presence of creep inducing force and which is relatively fast and easy to carry out.

For the purpose of this specification, the term "cable" is intended to include cables as well as conductors within cables.

Further, for the purpose of this specification, the term "insulator" is intended to include any polymeric sheath on a cable.

SUMMARY OF THE INVENTION

According to the invention there is provided a method of forming an anchor on an insulated cable, the method including the steps of:
  providing a wicking material in contact with the insulation of the cable;
  introducing a liquid, settable adhesive into the wicking material on the insulated cable; and
  allowing the liquid, settable adhesive to be wicked into the wicking material and to set so as to bond the wicking material to the insulation of the cable and form a projecting anchor on the insulated cable.

The cable may be an electrical power cable, or a data, communications, or fiber optic cable.

In one embodiment, the step of providing a wicking material in contact with the insulated cable includes:
  providing a holder on the insulated cable for receiving a wicking material and for holding the wicking material in contact with the insulation of the cable.

The holder may be generally cup-shaped with a base and an annular wall extending from the base, and the holder may include a generally circular opening in the base for receiving the insulated cable. In this embodiment, the end of the cable may be passed through the opening in the base of the holder to selectively position the holder on the insulated cable proximate one end thereof. In this way, the holder may be used to form an annular space around the insulation of the cable for receiving the wicking material.

The wicking material may be in the form of a powder, a granular material, a fibrous material, or a mixture or combination thereof.

Suitable wicking materials include crushed expanded perlite, crushed natural zeolite, silica powder, table salt, thermoplastic or thermoset granules, sodium bicarbonate, and mixtures or combinations thereof.

Optionally, the wicking material may be pre-treated with chemical agents which modify the surface tension of the wicking material and/or the curing speed of the settable adhesive, and/or which facilitate the liquid settable adhesive and wicking material combination in bonding to the polymeric material of the insulation on the cable.

In one embodiment, the wicking material includes a polyethylene granular thermoplastic.

The liquid settable adhesive may, when combined with the wicking material, produce exothermic heat when setting.

The settable adhesive may be introduced into the holder as a single component.

Alternatively, the settable adhesive may be introduced into the holder as two or more components.

The settable adhesive may be an acrylic-based compound, such as a cyanoacrylate-based compound, or a two-part epoxy which preferably has a low viscosity and a fast curing time.

A suitable settable material is ethylcyanoacrylate having a viscosity of about 2 MPa.s.

The holder may be formed from a plastics material such as a thermoset or a thermoplastic which may be elastomeric. In one particular embodiment, the holder is formed from a thermoplastic comprising a blend of EPDM and polyethylene.

In another embodiment, the step of providing a wicking material in contact with the insulated cable comprises:
  providing a body formed from a wicking material on the insulated cable so that the body contacts the insulation of the cable.

In this embodiment, the body may be formed in the shape of a ring which can be passed over the insulated cable and selectively positioned on the insulation proximate one end of the cable.

The ring-shaped body may be formed from an open cell sponge.

The anchor formed on the insulated cable may be sized and shaped to engage a cable entry device for electrical apparatus. For example, the anchor may be designed to mechanically engage a cable gland for attaching an electrical power cable to an electrical apparatus. However, the anchor could also be used to engage other elements such as, for example, soil in a trench, walls of ducts or structural elements of cable trays.

The invention extends to a kit for forming an anchor on an insulated cable according to the methods described above, the kit including:
  a wicking material which can be located in contact with insulation of a cable; and
  a liquid settable adhesive for introduction into the wicking material once it is in contact with the insulated cable.

The wicking material may be in the form of a powder, a granular material, a fibrous material, an open cell sponge, or a mixture or combination thereof.

The liquid settable adhesive may be an ethylcyanoacrylate having a viscosity of about 2 mPa.s.

The invention also extends to an anchor on an insulated cable formed in accordance with the methods described above.

BRIEF DESCRIPTION OF THE DRAWINGS

FIG. 1 shows a perspective view of an insulated electrical power cable carrying a holder for forming an anchor in accordance with a first embodiment of the invention;

FIG. 2 shows a perspective view of the holder for forming the anchor;

FIG. 3 shows, in partial cross section, an anchor formed on the insulation of the electrical power cable in accordance with the first embodiment of the invention;

FIG. 4 shows a perspective view of an insulated electrical power cable carrying a ring for forming an anchor in accordance with a second embodiment of the invention;

FIG. 5 shows a perspective view of the ring for forming the anchor; and

FIG. 6 shows, in partial cross section, an anchor formed on the insulation of the electrical power cable in accordance with the second embodiment of the invention.

DESCRIPTION OF PREFERRED EMBODIMENTS

The present invention has application in the electrical field and may be embodied in a method of forming an anchor on an insulated electrical power cable, in particular an unarmoured electrical power cable.

FIG. 1 of the accompanying drawings illustrates an insulated electrical power cable 10 carrying a holder 12 for forming an anchor on the insulated cable in a method according to a first embodiment of the present invention.

In this embodiment, the electrical power cable is an unarmoured cable 14 having three conductors 16A, 16B and 16C within conventional polymeric insulation 18A, 18B and 18C, and the insulated conductors are embedded within a sheath 20.

With reference also to FIG. 2 of the drawings, the holder 12 is generally cup-shaped with a base 22 and an annular wall 24. The base 22 defines a generally circular opening 26 for receiving the sheath 20 of the electrical power cable 10 in the manner illustrated most clearly in FIG. 1.

FIG. 3 shows how a projecting anchor 28 may be formed on the sheath of the unarmoured cable 14 at a location proximate the conductors 16A, 16B and 16C. To form the anchor 28, the holder 12 is slid onto the end of the unarmoured cable 14 into the position illustrated in FIG. 3, and a wicking material 30 is introduced into the cup-shaped holder 12, as shown, so that the wicking material contacts the sheath 20 of the cable 10. Thereafter, a liquid, settable adhesive 32 is introduced into the holder 12 and is allowed to be wicked into the wicking material 30 and to set. As the adhesive 32 is wicked and sets in the holder 12, the anchor 28 is formed as a ring or flange which is bonded to the sheath 20 and which projects radially from the sheath.

The wicking material may be in the form of a powder, a granular material, a fibrous material, or a mixture or combination thereof.

Suitable wicking materials include, but are not limited to, crushed expanded perlite, crushed natural zeolite, silica powder, table salt, thermoplastic or thermoset granules, sodium bicarbonate, and mixtures or combinations thereof.

In this embodiment, the wicking material comprises chemically treated thermoplastic granules, and the settable material is ethylcyanoacrylate having a viscosity of about 2 mPa.s.

The holder typically is formed from a thermoset or a thermoplastic comprising a blend of EPDM and polyethylene.

The anchor 28, once formed, is sized and shaped to engage a cable entry device for electrical apparatus such as, for example, a cable gland (not shown) for attaching the electrical power cable to an electrical apparatus (also not shown).

FIGS. 4 to 6 of the accompanying drawings illustrate a second embodiment of the invention. In FIG. 4, an insulated electrical power cable 110 is seen carrying a ring-shaped body 112. The body 112 is also illustrated in FIG. 5 and is formed from an open cell sponge which comprises the wicking material for an anchor.

The electrical power cable 110 is similar to the power cable 10 of the first embodiment, and also comprises an unarmoured cable 114 having three conductors 116A, 116B and 116C within conventional polymeric insulation 118A, 118B and 118C, with the insulated conductors being embedded within a sheath 120.

To form an anchor on the insulated cable 110, the ring-shaped body 112 is slid onto the end of the unarmoured cable 114 into the position illustrated in FIG. 6 in which the radially inner surface of the body 112 contacts the sheath 120 of the cable 110. Thereafter, a liquid, settable adhesive 132 is introduced into the body 112 and is allowed to be wicked into the body and to set. As the adhesive 132 is wicked into the open cell sponge and sets, it bonds the body 112 to the sheath 120 and forms a rigid anchor, as shown.

As before, the anchor may be sized and shaped to engage a cable entry device for electrical apparatus such as, for example, a cable gland (not shown) for attaching the electrical power cable to an electrical apparatus (also not shown).

It will be appreciated that the method of the invention could also be used to form an anchor on the insulation of an armoured cable, or on the insulation of conductors of electrical power cables. The method could also be used to form anchors on other types of insulated cables, for example, on data, telecommunications or fiber optic cables.

One advantage of using an anchor as described in the embodiments above is that it makes it possible to fit a cable gland to the insulated cable without inducing compression on the insulation of the cable. This in turn avoids creep over time and hence a loss in effectiveness of the cable gland.

Further, it is possible to select the adhesive and the wicking material to achieve a relatively short curing time.

The anchor also avoids the need for a compression nut arrangement which is used in conventional compression cable glands and which tends to be relatively expensive.

Finally, it is relatively easy to properly install the anchor on site.

I claim:

1. A method of forming an anchor on an insulated cable for anchoring an end of the cable, the method including the steps of:
    providing a body formed from a wicking material, the body defining an opening therethrough;
    passing the end of the insulated cable through the opening so that the end of the cable extends from the body of the wicking material, and the wicking material is located on the cable, proximate the end of the cable, and in contact with the insulation of the cable;

introducing a liquid, settable adhesive into the body of wicking material on the insulated cable; and allowing the liquid, settable adhesive to be wicked into the wicking material and to set so as to bond the body of the wicking material to the insulation of the cable, thereby forming a projecting anchor which is configured for subsequent engagement proximate the end of the cable for anchoring the end of the cable.

2. A method of forming an anchor on an insulated cable according to claim 1, wherein the step of providing the wicking material in contact with the insulation of the cable includes chemically pre-treating the wicking material so as to modify the surface tension of the wicking material, and/or modify the curing speed of the settable adhesive, and/or facilitate the liquid settable adhesive and wicking material combination in bonding to a polymeric material of the insulation on the cable.

3. A method of forming an anchor on an insulated cable according to claim 1, wherein the step of introducing a liquid, settable adhesive into the wicking material includes introducing an acrylic-based compound into the wicking material.

4. A method of forming an anchor on an insulated cable according to claim 3, wherein the step of introducing a liquid, settable adhesive into the wicking material includes introducing a cyanoacrylate-based compound into the wicking material.

5. A method of forming an anchor on an insulated cable according to claim 1, wherein the liquid settable adhesive, when combined with the wicking material, produces exothermic heat when setting.

6. A method of forming an anchor on an insulated cable according to claim 1, wherein the step of introducing a liquid, settable adhesive into the wicking material includes introducing ethylcyanoacrylate into the wicking material.

7. A method of forming an anchor on an insulated cable according to claim 1, wherein the cable is an electrical power cable, a data cable, a communications cable or a fiber optic cable.

8. A method of forming an anchor on an insulated cable according to claim 1, wherein the body of wicking material is formed in the shape of a ring and wherein the step of passing the end of the insulated cable through the opening in the body of wicking material comprises sliding the ring-shaped body onto the end of the insulated cable.

9. A method of forming an anchor on an insulated cable according to claim 8, wherein the ring-shaped body is formed from an open cell sponge.

\* \* \* \* \*